Oct. 7, 1969    L. B. SCOTT    3,470,903
PRESSURE OPENABLE TUBING TESTER
Filed Jan. 25, 1967    5 Sheets-Sheet 1
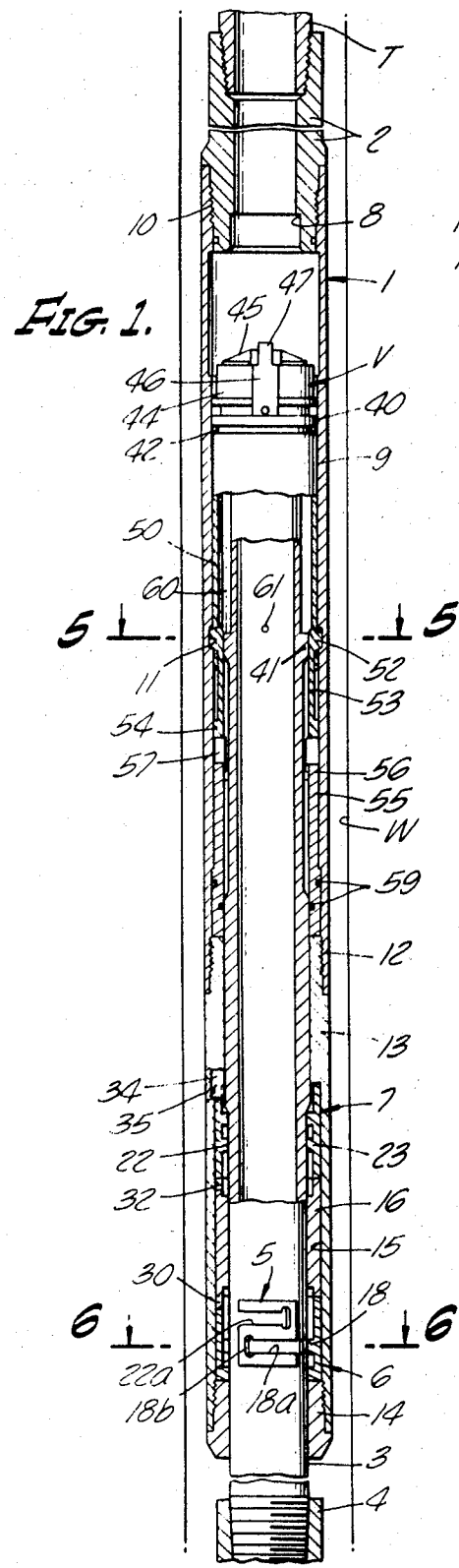
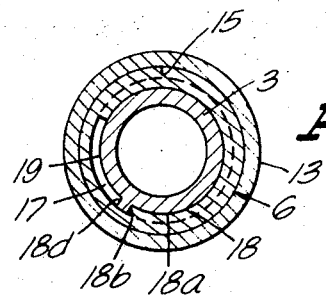
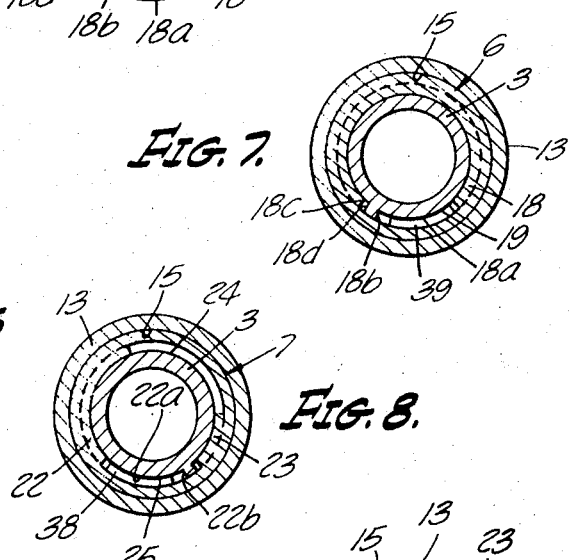
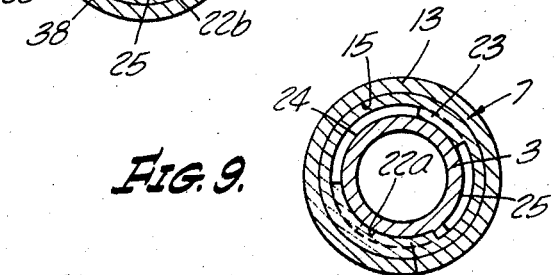
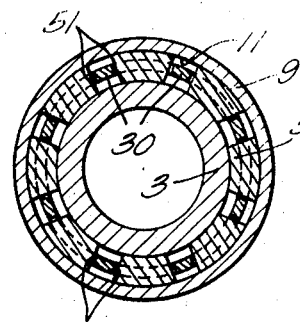
LYLE B. SCOTT
INVENTOR.
BY John O. Evans, Jr.
ATTORNEY

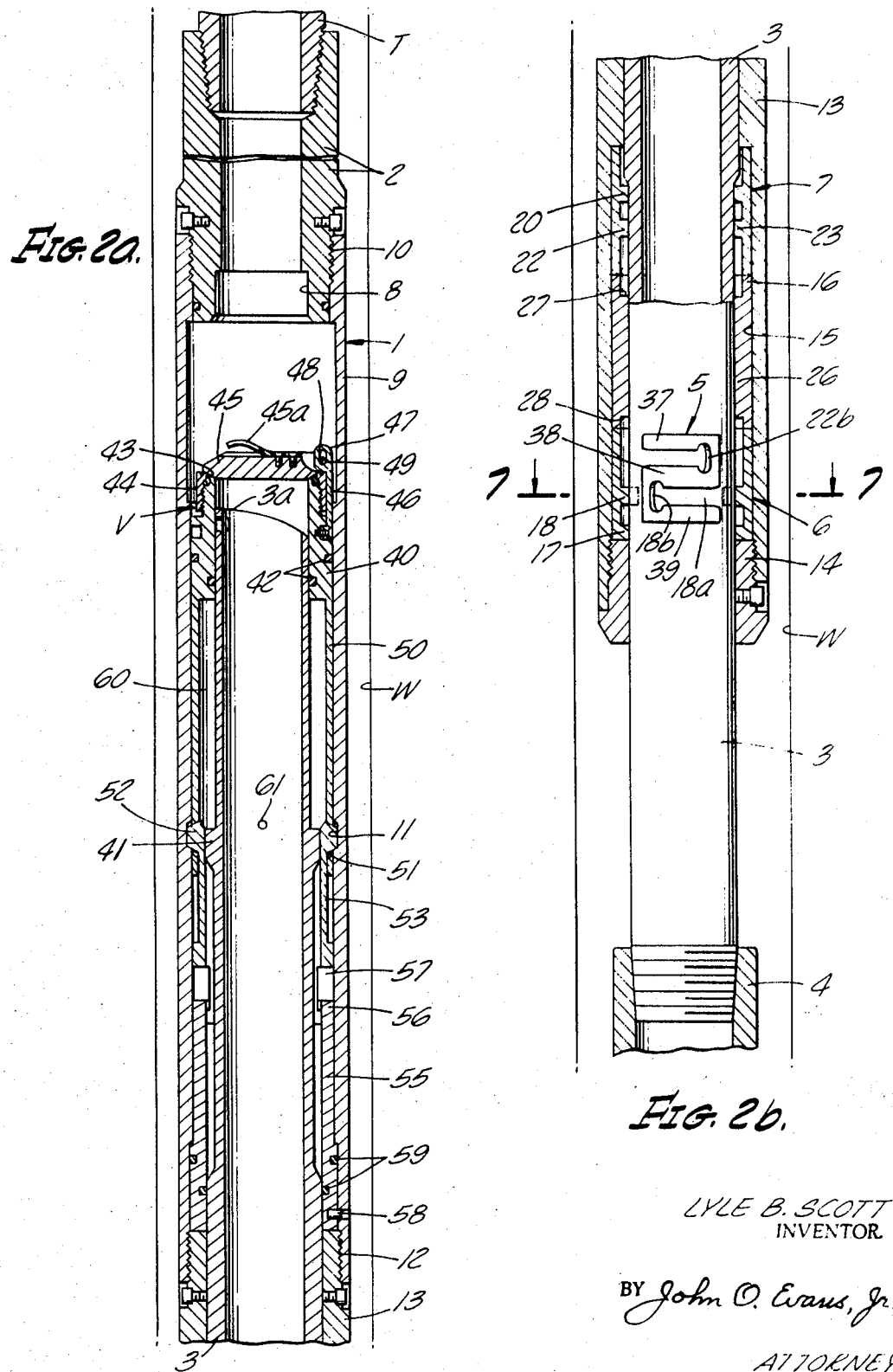

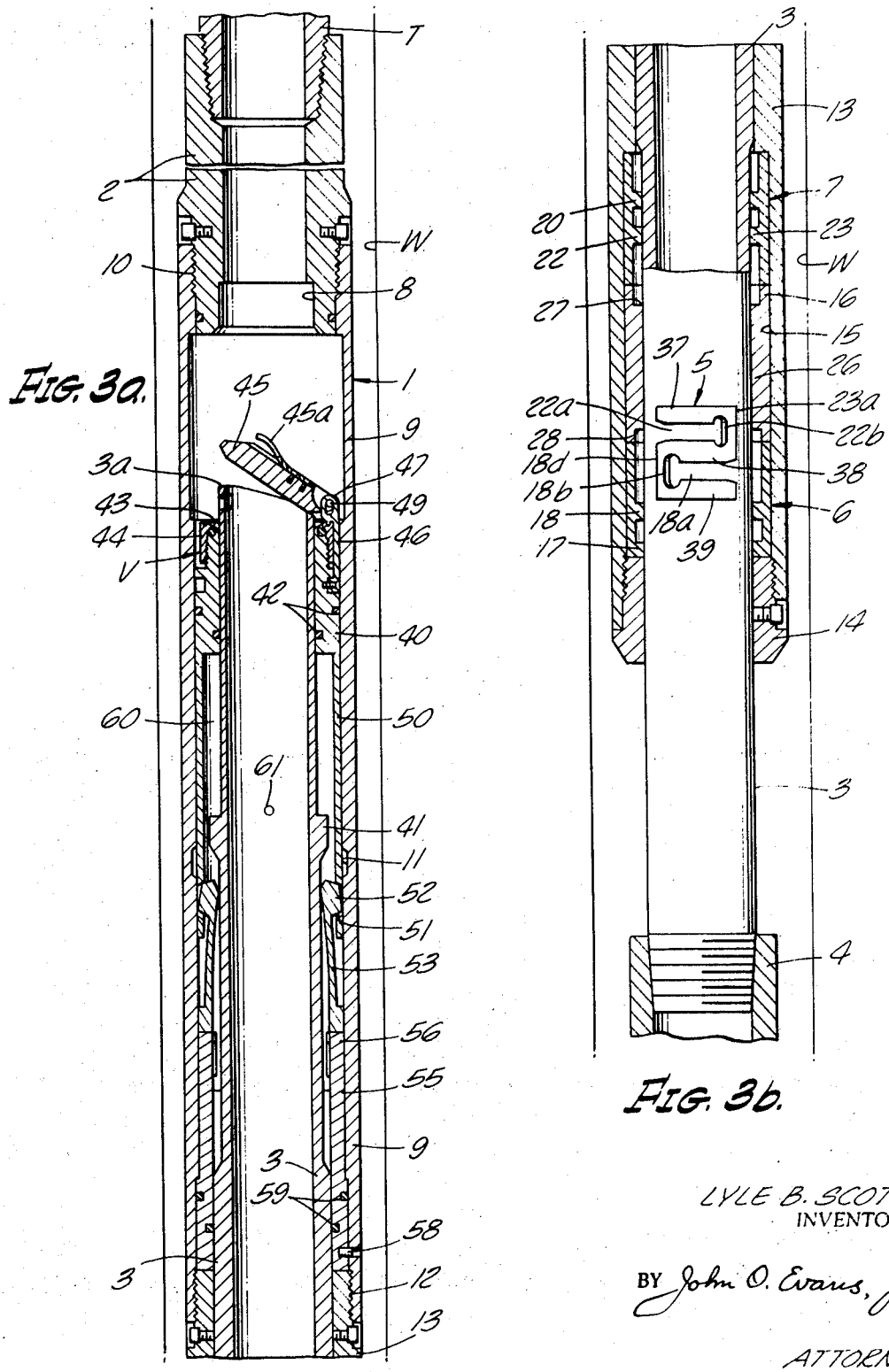

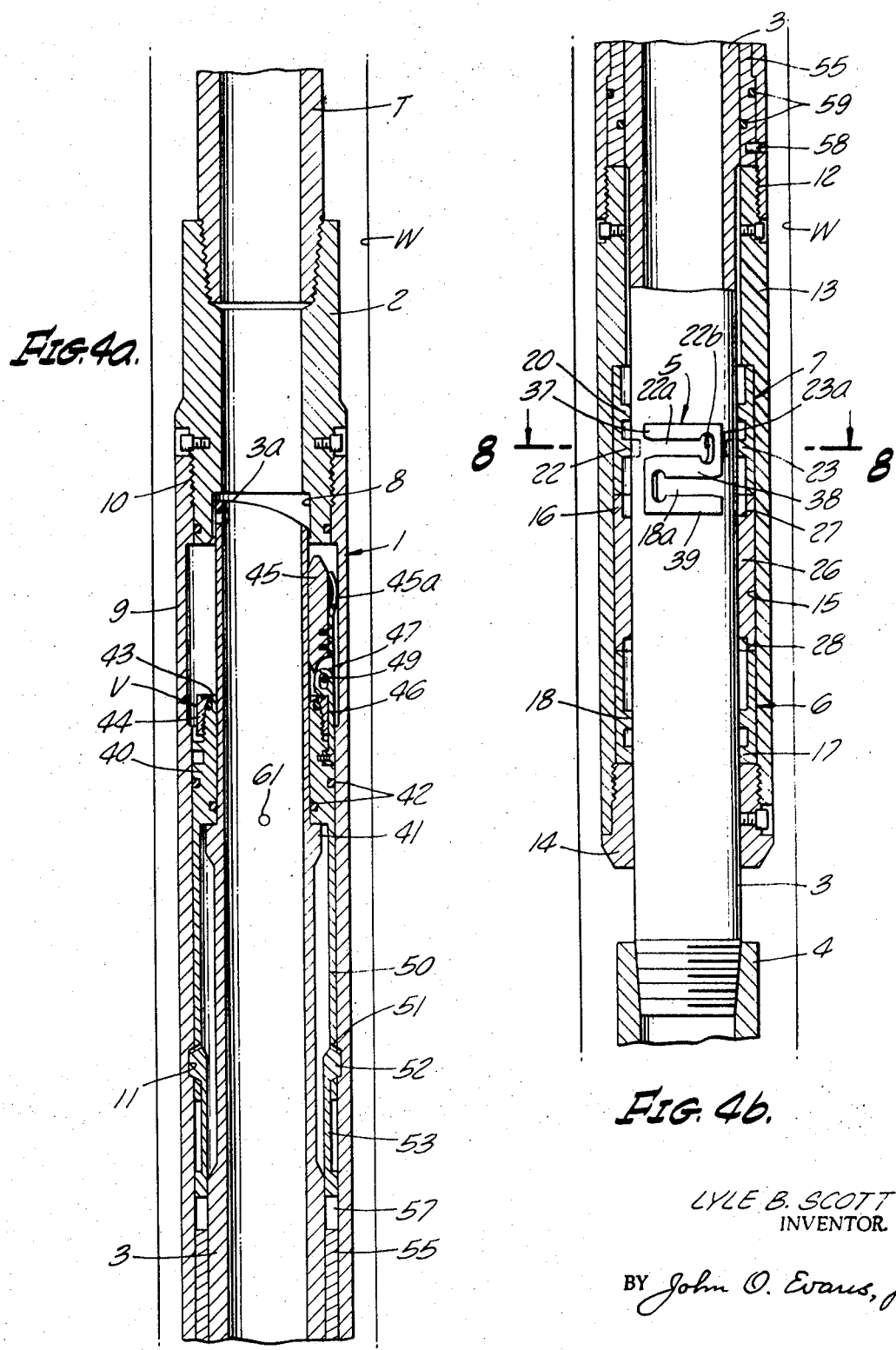

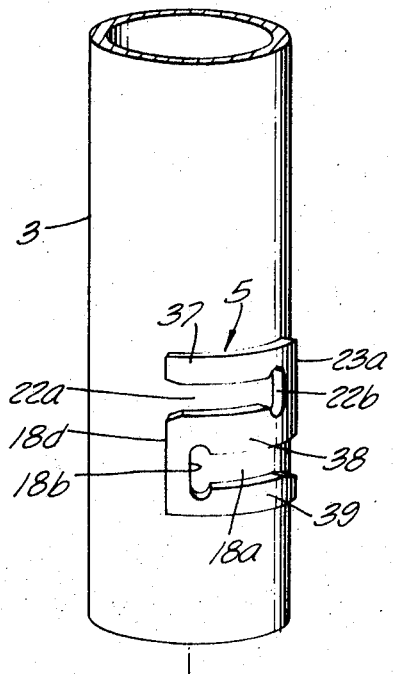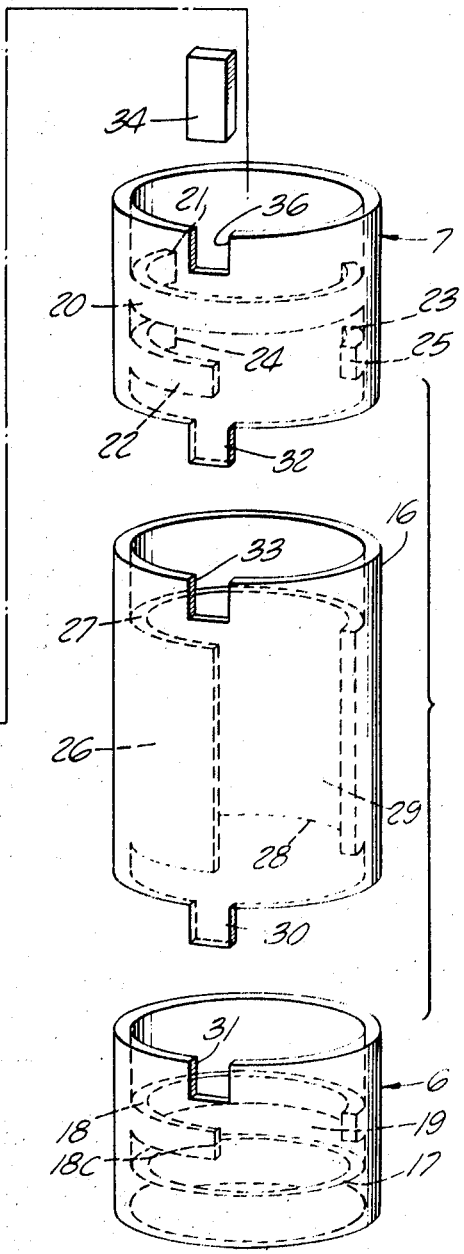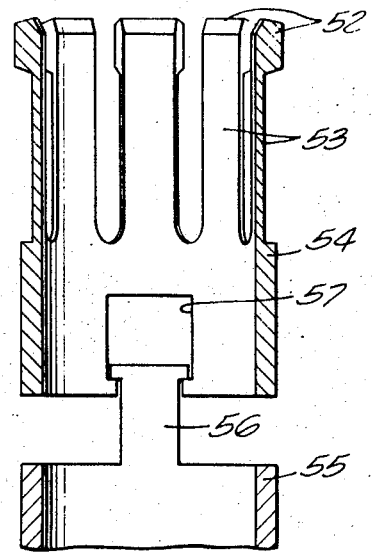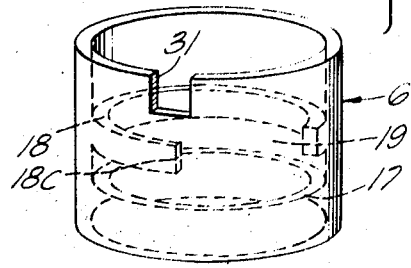
FIG. 10.
FIG. 11.
LYLE B. SCOTT
INVENTOR.
BY John O. Evans, Jr.
ATTORNEY

United States Patent Office 3,470,903
Patented Oct. 7, 1969

3,470,903
PRESSURE OPENABLE TUBING TESTER
Lyle B. Scott, South Gate, Calif., assignor to Byron Jackson, Inc., Long Beach, Calif., a corporation of Delaware
Filed Jan. 25, 1967, Ser. No. 611,745
Int. Cl. F16k *15/00, 17/00, 17/26*
U.S. Cl. 137—467          11 Claims

ABSTRACT OF THE DISCLOSURE

A tubing tester in which a flap valve is opened by pressure differential acting on the valve seat, and the telescopic bodies of which are latched in positions which latch the valve seat in valve closing position and in valve open position.

---

The present invention relates to tubing testers and more particularly to a tubing tester which is adapted to be opened and closed in a string of tubing or pipe employed to run a packer into a well to enable the treatment of the well by the pumping of treating fluid, cement, acid, fracturing fluid, and the like, through the tubing string into the well below the packer.

Tubing testers in accordance with the prior art have heretofore involved the use of means responsive to telescopic extension of a pair of tubular bodies for opening a valve or closing the valve, whereby the tubing string may be pressurized to determine the existence of a leak in the tubing string preliminary to the pumping of well treating fluid through the tubing string so as to enable repair of the leak in the tubing before commencement of the pumping operation. The prior art has provided camming means for opening the valve (Clark Patent No. 2,853,265), or link means for opening the valve (Lyle B. Scott patent application, Ser. No. 416,764, filled Dec. 8, 1964, now Patent No. 3,338,312), but such prior art valves, have not been wholly satisfactory due to the fact that high hydrostatic pressure differentials across the closed valves have caused problems heretofore not solved.

Accordingly, an object of the present invention is the provision of a tubing tester, the valve of which is easily opened notwithstanding the presence of high pressure in the tubing string tending to hold the valve closed.

More particularly, an object of the invention is to provide a tubing tester wherein the hydrostatic fluid column tending to hold the valve closed is employed to assist in opening the valve, as a result of which the valve is openable under all differential pressure conditions.

A further object of the invention is to provide a tubing tester, the telescopic parts of which may be releasably interlocked in relative positions in which the tester is latched with the valve free to open as the string of tubing is being run into the well bore to allow the bypass of well fluid therethrough, and the valve being operable automatically to prevent downward fluid flow through the tubing string to enable testing of the ability of the tubing string to sustain subsequent well treating pressure; but the telescopic parts being releasable for movement to another position at which the valve is openable by the pressure of fluid in the tubing string thereabove; and thereafter the telescopic parts being adapted to be releasably latched in still another position at which the valve is held in an out-of-the-way position during the pumping of well treating fluid therethrough.

A specific object of the invention is to provide in a tubing tester valve assembly a fluid pressure openable valve subassembly which is normally, while running the tubing string and tubing tester into a well, latched in a first position in which the valve is downwardly closeable, but which is adapted to be unlatched in response manipulation of the tubing string so that the valve will be opened in response to the pressure of the fluid column in the tubing thereabove, the valve therefore being openable under all of the various pressure conditions under which the previously available tubing testers have posed problems in respect of high tension forces applied thereto to mechanically open the same under condition of high pressure differential tending to hold the valve closed.

Still another object of the invention is to provide a latch mechanism which is positive in its latching action for controlling a telescopic tubing assembly, but which is nevertheless compatible with a packer also installed in a tubing string and requiring rotative manipulation in the conditioning of the packer for setting and/or release. In this connection, the tubing tester, for example, is provided with a latch mechanism for releasably holding the telescopic tester parts in a first or running in condition, which latch mechanism is releasable responsive to left-hand rotation of the running in string to enable movement of the telescopic parts to a second relative axial position at which they may be re-latched responsive to left-hand rotation. Thus the tubing tester latch mechanism will be compatible with a packer in the tubing string which is adapted to be conditioned for setting responsive to right-hand rotation of the tubing string, in the example. Similarly, the tubing tester latch mechanism is adapted to be latched with the telescopic parts in either of the first or second relative telescopic or axial positions responsive to right-hand rotation.

In brief, a tubing tester valve assembly in accordance with the invention may include inner and outer tubular bodies movable to first and second positions, valve means including a valve and a seat therefor in the bodies closable when the bodies are in the first position, means for opening the valve means upon movement of the bodies to the second position, the last-mentioned means including movable means carrying the valve and seat and being movable responsive to differential fluid pressure in the bodies for opening the valve means, and releasable means for preventing movement of the movable means and opening of the valve means when the bodies are in the first position and releasable upon movement of the bodies towards the second position to permit the valve means to open.

Other objects and advantages will be hereinafter described or will become apparent to those skilled in the art, and the novel features of the invention will be defined in the appended claims.

In the accompanying drawings:

FIG. 1 is a view partly in vertical section and partly in elevation, showing a tubing tester made in accordance with the invention, installed in a tubing string, and in condition for running into a well bore and for enabling testing of the tubing above the downwardly closing valve;

FIG. 2a is an enlarged detail view in vertical section showing the upper portion of the tubing tester of FIG. 1, after rotation of the tubing string to release the latch means;

FIG. 2b is a downward extension of FIG. 2a;

FIG. 3a is a view generally corresponding to FIG. 2a, showing the parts telescopically shifted to positions at which the valve is initially opened;

FIG. 3b is a downward extension of FIG. 3a;

FIG. 4a is a view generally corresponding to FIG. 3a, but showing the parts further telescoped to positions at which the valve is fully opened and held out of the way to enable the passage of well treating fluid through the tubing tester, but prior to rotation of the tubing string to latch the assembly in the illustrated condition;

FIG. 4b is a downward extension of FIG. 4a;

FIG. 5 is an enlarged fragmentary detail view in section, as taken on line 5—5 of FIG. 1;

FIG. 6 is an enlarged fragmentary detail view of section, as taken on the line 6—6 of FIG. 1;

FIG. 7 is a view in section, as taken on the line 7—7 of FIG. 2b;

FIG. 8 is a view in section, as taken on the line 8—8 of FIG. 4b;

FIG. 9 is a view corresponding to FIG. 8, but showing the parts rotated and latched;

FIG. 10 is an exploded detail view in perspective illustrating the details of the releasable rotary latch mechanism; and FIG. 11 is a fragmentary detail view in vertical section through the reciprocable latch mechanism.

Like reference characters in the several views of the drawings and in the following description designate corresponding parts.

Referring first to FIG. 1, the tubing tester of the invention will be seen to comprise an outer, upper, tubular body 1 having at its upper end a coupling 2 adapted for connection in a running in string of tubing or other pipe T, the body 1 being telescopically connected with an inner, lower, tubular body 3 having at its lower end means such as a threaded coupling 4 whereby it may be connected to a downward extension of the tubing string T.

Means are provided for releasably latching bodies 1 and 3 in first and second telescopically adjusted relative axial positions including cooperative latch members 5 on inner body 3 and 6 and 7 in the outer body 1, respectively. Valve means V are provided for normally closing downwardly but openable when the tubing tester is moved downwardly through fluid in a well W when latch members 5 and 6 are engaged (FIG. 1) or when the outer body 1 is in its uppermost position relative to the inner body 3 and latch members 5 and 6 are disengaged (FIG. 2b). When the outer body 1 is moved downwardly relative to inner body 3 (FIG. 3a) the valve means V includes means for opening the same responsive to differential pressure across the valve means, the upper body 1 then being movable further downwardly until latch member 5 is engageable with latch member 7 at the second telescopic position (FIG. 2b) at which the upper body 1 is in its lowermost position relative to the inner body 3 and the valve V is fully opened and held aside to allow flow of treating fluid through the bodies 1 and 3.

Preferably, the inner body 3 has an opening therethrough substantially equal in area to the area of the tubing passage so as to offer no substantial restriction to flow and so as to enable the passage of various devices therethrough, such as wire line tools or perforating tools as well as to allow passage of devices entrained in the flowing treating fluid such as perforation ball sealers, hydraulic perforating devices or the like. The inner body 3 moreover is of such length as to extend at its upper end into a cavity 8 at the upper end of the outer body 1, when, as seen in FIGS. 4a and 4b, the outer body 1 is in its lowermost position relative to the inner body. With such a construction, the well treating flows through the inner body throughout the length of the tester.

Referring more specifically to the outer body 1, it includes in the illustrative embodiment an elongated body section 9 threadedly or otherwise connected at 10 to the tubing coupling 2. Intermediate its ends, the section 9 of body 1 has an internal annular groove 11. At its lower end, outer body section 9 is threadedly or otherwise connected at 12 to a further downwardly extended body section 13 at the lower end of which is a bushing 14 through which extends the lower body 3. Within this body section 13 are the upper and lower latch members 6 and 7 previously referred to and best illustrated in FIG. 10.

These latch members, in the illustrative embodiment, are composed of cylindrical members disposed in a counterbore 15 in body section 13 and spaced apart by a cylindrical spacer 16. Latch member 6 is provided internally with a lower stop shoulder 17 and spaced upwardly therefrom an arcuate latch or rib 18 having at one side thereof an opening 19. Latch member 7 has an arcuate upper stop shoulder 20 having at one side an opening 21, and spaced below the stop 20 is an arcuate latch or rib 22 and a stop 23 defining therebetween an opening 24 aligned with opening 21 in stop 20 and an opening 25 angularly spaced therefrom. Spacer 16 has therein an elongated section 26 of reduced inside diameter and providing an upper shoulder 27, a lower shoulder 28 and an elongated opening 29.

Means are provided for enabling the installation of the latch members 6 and 7 and the spacer 16 in the counterbore 15 of lower body section 13 in relative angular dispositions in which opening 19 in rib 18, opening 29 in spacer 16, and opening 25 in latch rib 22 of latch member 7 are axially aligned. Such means includes a key lug and key slot 30 and 31, respectively, provided on and in spacer 16 and latch member 6, as well as a similar key lug and keyway 32 and 33, respectively, on and in latch member 7 and spacer 16. In addition, a key 34 is provided in the counterbore 15 of body section 13, as by welding the same in a window at 35 (FIG. 1), the key 34 being engageable in a keyway 36 in the upper end of latch member 7, whereby upon assembly the relative position of all of the cylindrical latch and spacer members 6, 7 and 16 is fixed when they are installed and held in place by bushing 14 at the lower end of the counterbore 15.

The cooperative latch member 5, which coacts with latch members 6 and 7 to limit opposite telescopic movement of the bodies 1 and 3 and to latch the same in the opposite extremes of telescopic movement is of general Z form and includes an upper angularly extended arm 37, an intermediate arm 38, and a lower arm 39. Between arms 37 and 38 is an upper slot 22a extending circumferentially and terminating at one end at a vertical stop 22b. Between arms 38 and 39 is a lower slot 18a extending circumferentially oppositely with respect to upper slot 22a and terminating at one end in a vertical stop 18b. Latch rib 18 of member 6 is engageable in lower slot 18a and latch rib 22 of member 7 is engageable in slot 22a, as will hereinafter appear to latch the bodies in their extreme telescopic positions.

The angular extent of latch member 5 is such as to allow its passage through longitudinal space 29 in spacer 16, as well as through the space 19 in latch rib 18 of member 6 and the spaces 21, 24 and 25 in stop shoulder 20 and between latch rib 22 and stop 23 of latch member 7. Thus, assembly of the tester and relative longitudinal or telescopic movement of the bodies 1 and 3 are enabled.

For purposes of assembly, it will be understood that prior to assembly of body section 9 with body section 13 of the outer body 1, and with the bushing 14 removed from the lower end of the body section 13, the inner body 3 may be extended below the lower end of body section 13 a distance sufficient to allow the cylindrical latch member 7 to be applied over the lower end of body 3 and moved axially thereof past the latch member 5 which will pass through spaces 21 and 24 and may then be oriented in the counterbore 15 with respect to key 34. Thereafter, inner body 3 may be drawn into outer body 1 until arm 38 of latch member 5 is disposed in or aligned with space 25 of latch member 7. Next, spacer 16 and latch 6 may be placed endwise over the lower end of inner body 3 and moved into the counterbore 15 to effect engagement of key lugs 30 and 32 in key slots 31 and 33 of the spacer and the latch members 6 and 7. Installation of bushing 14 in the lower end of outer body section 13 will then secure the assemblage together.

When thus assembled, it will now be understood that relative telescopic movement of bodies 1 and 3 will be limited to two extreme positions, namely, a first position at which upper latch arm 37 of latch member 5 engages angularly extended stop 20 above space 25 between latch rib 22 and stop 23, and a second position at which the latch arm 39 of latch member 5 engages annular stop 17 below space 19 in latch rib 18 of latch member 6.

When the bodies 1 and 3 are in the first extreme telescopic position, which is a retracted position, stop 23 of member 7 is engageable with the vertical surface 23a of latch member 5 to prevent relative right-hand rotation of the outer body 1, but left-hand rotation of body 1 will cause latch rib 22 to move into latch slot 22a of member 5 until rib 22 engages vertical stop 22b. When the bodies 1 and 3 are in the second extreme telescopic position, which is an extended position, end 18c of latch rib 18 in member 6 is engageable with vertical face 18d of latch member 5 to prevent relative left-hand rotation of the upper body 1, but right-hand rotation of body 1 will cause latch rib 18 to move into latch slot 18a of member 5 until latch rib 18 engages vertical stop 18b. When latched by members 5 and 7, as described above, the bodies may be released for telescopic movement responsive to right-hand rotation of upper body 1 relative to lower body 3; and when latched by members 5 and 6 the bodies may be released for telescopic movement responsive to left-hand rotation of the upper body 1 relative to the lower body.

It will be understood by those skilled in the art that the lower body section 1 will normally be held stationary by suitable means such as the friction drag device of the usual packer in the tubing string T below the present assembly.

The relative telescopic movement described above is adapted to cause the operation of the valve means V. Valve means V includes an annular valve support and seat 40 slidably disposed upon the upper end of the inner body 3 above an annular flange 41 on the latter. Sealing means in the form of O-rings 42 are provided for sliding sealing engagement between valve support member 40 and the body 3 and between said support member and body 1. At its upper end, valve support 40 is suitably formed to provide a valve seat 43 and may be provided with a resilient seating member retained in place by a threaded collar 44.

Valve means V further includes a flap 45 engageable with the seat 43 and pivotally mounted at one side of member 40 for movement between a seated position as seen in FIGS. 1 and 2a and the partially open and fully open laterally displaced positions shown in FIGS. 3a and 4a. For supporting the valve flap 45 a support member 46 is mounted at one side of valve member 40 and has an upper end 47 projecting beyond the valve seat 43. In this end 47 is a vertically elongated slot 48 through which extends a pin 49 carried by valve flap 45. Thus, pivotal connection is provided in which the valve flap has freedom of vertical motion for a purpose which will hereinafter become apparent.

Depending from valve support and seating member 40 is a skirt 50 which extends downwardly in the annular space between inner body 3 and outer body section 9 to a location below the above-mentioned annular groove 11 of said body section 9. As best seen in FIG. 5, skirt 50 adjacent its lower end is provided with a circular series of openings 51. Latch projections 52 at the upper end of a corresponding number of resilient latch fingers 53 are adapted, when in the positions shown in FIGS. 1 and 2a, to extend through the openings 51 and into the groove 11 in body section 9 to retain skirt 50 and thus valve support and seating member 40 in an upper or first valve seating position.

These latch fingers 53 are upward projections of an upper valve latching sleeve or member 54 which is connected by a lost-motion connection to a lower sleeve 55. This lost-motion connection, as seen in FIG. 11, comprises T-heads 56 on sleeve 55 and vertically elongated T-slots 57 in upper sleeve 54, whereby relative axial movement between sleeves 54 and 55 may take place when the tester is being manipulated to cause opening of the valve means V. The lower end of sleeve 55 is connected to the upper section 9 of outer body 1 as by a pin 58 (see FIG. 2a), and seal rings 59 are provided to form a seal between the inner body 3, outer body section 9 and the sleeve 55.

It is now notable that between valve support and seating member 40 and the sealed connection of the sleeve 55 to the outer body section 9, there is provided an annular chamber 60 sealed off from the exterior of the assembly but having internal communication with the inside of inner body 3 through one or more ports 61, so that the pressure inside chamber 60 corresponds to that inside the inner body 3. Thus, when the valve means V is open the valve support member 40 is pressure balanced. However, when the flap 45 is seated, any pressure above the flap in excess of pressure below the flap produces a force tending to move valve support 40 downward. Such downward movement is prevented by engagement of latch projections 52 in groove 11 of body section 9 (FIGS. 1 and 2a) so long as the bodies are in their extended telescopic positions and the annular flange 41 on inner body 3 is disposed within the upper ends of latch fingers 53 to hold their projections 52 in the groove 11. These conditions prevail when latch member 5 is engaged with latch member 6 as shown in FIG. 1, as well as when arm 39 of latch member 5 is engaged with annular stop 17 of latch member 6.

On the other hand, however, when latch fingers 53 are not engaged at their upper ends by inner body flange 41, due to telescopic retraction of the bodies upon downward movement of outer body 1 (see FIG. 3a), differential pressure across the closed valve flap 45 will produce a downward force to cause inward camming of latch projections 52 and further to cause downward movement of the valve support and seat 40 permitted by lost-motion slots 57, until the upper end 3a of the inner body causes unseating of the flap 45. In this connection, the body 3 has its upper end formed with an extremity 3a engageable with the flap 45 at a location diametrically opposed to pivot pin 49, and the upper end of the body 3 declines from extremity 3a to provide a cam surface for moving the flap to the full open and out-of-the-way position shown in FIG. 4a, as the body 3 moves into the cavity 8 at the outer body connector 2.

In order to permit such initial downward movement of the outer body 1 relative to inner body 3, the normal distance between upper extremity 3a of body 3 and the under surface of flap 45 should be at least as great as the distance between the under surface of flange 41 of body 3 and the upper ends of the latch projections 52 on fingers 53. The lost-motion slots 57 need have only sufficient height as to allow sufficient downward movement of valve support and seat 40 as to cause the flap to be cracked from its seat thereby balancing the pressure tending to cause such downward movement; thereafter, the flap is, as now understood, mechanically opened and cammed to the position shown in FIG. 4a, against the pressure of a leaf spring 45a on the flap 45 adapted to engage the outer body to provide resilient means for initially urging the flap to an angular position at which downward fluid flow will cause flap closure.

In the use of the tubing tester, it is run into a well with the bodies latched in the relatively extended first telescopic relation shown in FIG. 1, in which latch rib 18 of member 6 is engaged in slot 18a of latch member 5. Under these circumstances, valve flap 45 is free to swing open as the assembly moves downwardly through well fluid in well W, but at any location desired and as frequently as desired as the tubing is being made up and run, the tubing may be pressurized above the tester and flap 45 will seat. In the event that the well is dry, fluid is added to the tubing string above the flap 45 to enable testing. If found necessary or desirable, the valve means V may be manipulated to open the same after testing, but the valve may be lowered to successively lower positions without manipulation, and in the presence of well fluid the tubing will automatically fill.

In order to open the valve means V after testing if desired and if differential pressure is holding the flap 45 closed, it is necessary to relieve the differential pressure holding flap 45 closed. Accordingly, left-hand rotation of the tubing string will rotate outer body 1 until end 18c of latch rib 18 engages vertical stop 18d, at which location the latch member 5 is vertically aligned with opening 29 is spacer 16 to allow downward movement of upper body 1. As body 1 moves downwardly, latch fingers 53 move downwardly away from flange 41 on the inner body 3; whereupon the pressure differential will cause downward movement of valve support and seat 40 until the valve means V is cracked open (FIG. 3a), relieving the pressure differential and balancing pressure in chamber 60 with pressure in the tubing. Further downward movement of outer body 1 (FIG. 4a) will stretch the lost-motion connection so that T-heads 56 pull downwardly on the latch fingers 53 which in turn pull downwardly the valve support and seat 40 until the valve is fully open. If then it is desired to run the tubing farther into the well, the tubing is elevated to reverse the above actions until the assembly assumes the condition shown in FIGS. 2a and 2b, whereat the latch 5 may again be engaged with the latch 6.

However, if it is desired to treat the well by the pumping of treating fluid downwardly through the tubing tester, the telescopic bodies are latched in their retracted condition by rotation of the upper body to the left from the position shown in FIG. 4b, so that, as shown in FIG. 9, latch rib 22 of member 7 will move into slot 22a of latch member 5, whereby the bodies will then be latched in their second or inoperative telescopic positions.

While the specific details of the invention have been herein shown and described, changes and alterations may be resorted to without departing from the spirit of the invention as defined in the appended claims.

I claim:

1. A tubing tester valve assembly comprising: inner and outer tubular bodies movable to first and second positions, valve means in said bodies closable when said bodies are in said first position, and fluid pressure operated means for opening said valve means upon movement of said bodies to said second position, wherein said bodies are elongated telescopic members, and said fluid pressure operated means includes a chamber exposed to the pressure of fluid in said inner and outer bodies when said valve means is open, pressure responsive means exposed to the pressure of fluid in said chamber and in said outer member when said valve means is closed and movable by differential pressure to open said valve means, and releasable means for holding said pressure responsive means against such movement when said bodies are in said first position and releasable upon telescopic movement of said bodies toward said second position.

2. A tubing tester as defined in claim 1, and further wherein said bodies are provided with means for releasably latching the same in said first and second positions.

3. A tubing tester as defined in claim 1, and further wherein said pressure responsive means includes a valve seat, and said valve means includes a flap movable into and out of engagement with said seat, means movable mounting said flap, and including means for moving said flap off of said seat upon movement of said pressure responsive means following release of said releasable means.

4. A tubing tester as defined in claim 1, and further wherein said pressure responsive means includes a valve seat member, and said valve means includes a flap supported on said seat member for movement into and out of engagement with said seat, and said inner body having an end disposed for engagement with said flap to move the same off of said seat upon movement of said seat member relative to said inner member.

5. A tubing tester valve assembly comprising: inner and outer tubular bodies movable to first and second positions, valve means in said bodies closable when said bodies are in said first position, and fluid pressure operated means for opening said valve means upon movement of said bodies to said second position, wherein said bodies are elongated telescopic members, said bodies having an annular chamber therebetween, said fluid pressure operated means including a valve seat member shiftably disposed in said chamber in sealed relation to said bodies, said inner body having a port leading into said chamber, said valve means including a flap pivotally mounted on said seat member, latch means releasably holding said seat member to said outer member in a position at which said flap may engage said seat member when said bodies are in said first position and for allowing movement of said seat member relative to said bodies upon movement of said bodies towards said second position, and means on said inner member engageable with said flap to unseat the same upon said movement of said seat member.

6. A tubing tester as defined in claim 5, and further wherein said latch means includes members having a lost-motion connection, latch elements on one of said members and said outer body coengageable to hold said member extended, and means on said inner member operable to release said latch elements, said lost-motion connection then allowing said movement of said seat member.

7. A tubing tester as defined in claim 5, and further wherein pin and slot means pivotally mount said flap on said seat member.

8. A tubing tester as defined in claim 5, and further wherein latch means are provided on said bodies to releasably latch said bodies in said first and second positions and releasable upon relative rotation of said bodies.

9. A tubing tester as defined in claim 5, and further wherein latch means including a Z-shaped member on one body and axially spaced ribs and stops on the other body are provided to latch said bodies in both of said first and second positions upon relative rotation of said bodies in one sense and for releasing said bodies for telescopic movement upon relative rotation of said bodies in the other sense.

10. A tubing tester for enabling the testing of a running in string of pipe connectable to a well tool comprising: an upper, outer tubular body adapted to be connected to the running in string of tubing, a lower, inner tubular body extending telescopically into said outer body, said outer body having an internal groove between its ends, and axially spaced latch ribs adjacent its lower end, said bodies adjacent the upper end of said inner body defining an annular chamber, an annular valve seat member in said chamber sealingly engaged with said inner and outer bodies and shiftable axially relative thereto, a port leading into said chamber from said inner body below said seat member, a valve flap pivotally connected to said seat member and normally engageable with said seat member to prevent downward flow of fluid through said bodies, latch means on said inner body cooperable with said latch ribs in said outer body to releasably latch said bodies in first and second relative telescopic positions, and axially holding latch means for preventing fluid pressure responsive movement of said seat member axially of said bodies when said bodies are latched in said first telescopic position and for releasing said seat member for axially movement responsive to fluid pressure upon downward axial movement of said upper body relative to said inner body, said axially holding latch means including elements engageable in said groove in said outer body and connected to said seat member, lost-motion connection means connecting said elements to said outer body, means on said inner body for holding said elements in said groove when said bodies are in said first telescopic position and for releasing said elements upon downward movement of said outer body relative to said inner body, and said inner body having its inner end disposed for unseating engagement with said flap upon downward movement of said seat member following release of said elements from said groove.

11. A tubing tester valve assembly comprising: inner and outer tubular bodies movable to first and second positions, valve means including a valve and a seat therefor in said bodies closable when said bodies are in said first position, means for opening said valve means upon movement of said bodies to said second position, said last-mentioned means including movable means carrying said valve and seat and being movable responsive to differential fluid pressure in said bodies for opening said valve means, and releasable means for preventing movement of said movable means and opening of said valve means when said bodies are in said first position and releasable upon movement of said bodies toward said second position to permit said valve means to open.

References Cited

UNITED STATES PATENTS

| 2,152,794 | 4/1939 | Dripps | 137—467 |
| 2,377,947 | 6/1945 | Lewis | 137—467 XR |
| 2,853,265 | 9/1958 | Clark. | |
| 2,874,927 | 2/1959 | Conrad | 166—226 XR |
| 2,912,216 | 11/1959 | Conrad | 166—226 XR |
| 3,067,770 | 12/1962 | Fancher | 137—493 |
| 3,249,124 | 5/1966 | Berryman | 166—226 XR |

WILLIAM F. O'DEA, Primary Examiner
ROBERT G. NILSON, Assistant Examiner

U.S. Cl. X.R.
137—493, 495; 166—226

UNITED STATES PATENT OFFICE
CERTIFICATE OF CORRECTION

Patent No. 3,470,903    Dated July 31, 1970

Inventor(s) Lyle B. Scott

It is certified that error appears in the above-identified patent and that said Letters Patent are hereby corrected as shown below:

Column 1, line 37, "filled" should be --filed--; line 72 after "response" should be --to--.
Column 3, line 41, "2b" should be --4b--; line 56, after "treating" should be --fluid--.
Column 6, line 34, after "body" should be --3--.
Column 7, line 8, "is" should be --in--; line 61 (line 4 of claim 3), "movable" should be --movably--.
Column 8, line 63 (line 23 of claim 10), "axially" should be --axial--.

SIGNED AND SEALED
OCT 20 1970

(SEAL)
Attest:

Edward M. Fletcher, Jr.
Attesting Officer

WILLIAM E. SCHUYLER, JR.
Commissioner of Patents